United States Patent
Sisbot et al.

(10) Patent No.: US 12,233,858 B2
(45) Date of Patent: Feb. 25, 2025

(54) TRAILER MONITORING SYSTEM (71) Applicant: Toyota Motor Engineering & Manufacturing North America, Inc., Plano, TX (US)

(72) Inventors: Emrah Akin Sisbot, Menlo Park, CA (US); Seyhan Ucar, Mountain View, CA (US); Takamasa Higuchi, Mountain View, CA (US); Yongkang Liu, Mountain View, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 230 days.

(21) Appl. No.: 17/963,546

(22) Filed: Oct. 11, 2022

(65) Prior Publication Data

US 2024/0116497 A1 Apr. 11, 2024

(51) Int. Cl.
*B60W 30/09* (2012.01)
*B60Q 1/50* (2006.01)
*B60Q 5/00* (2006.01)
*B60Q 9/00* (2006.01)
*B60W 30/095* (2012.01)
(Continued)

(52) U.S. Cl.
CPC .............. *B60W 30/09* (2013.01); *B60Q 1/525* (2013.01); *B60Q 5/006* (2013.01); *B60Q 9/008* (2013.01); *B60W 30/0953* (2013.01); *B60W 30/0956* (2013.01); *B60W 50/14* (2013.01); *G06T 7/0002* (2013.01); *G06T 7/13* (2017.01); *G06T 7/50* (2017.01); *G06V 20/58* (2022.01); *H04N 7/183* (2013.01); *H04N 23/54* (2023.01); *B60W 2420/403* (2013.01); *G06T 2207/30252* (2013.01); *G06V 2201/08* (2022.01)

(58) Field of Classification Search
None
See application file for complete search history.

(56) References Cited

U.S. PATENT DOCUMENTS 9,963,004 B2 * 5/2018 Lavoie .................. B60T 8/1755
10,479,404 B2 * 11/2019 Auner .................... H04N 23/63
(Continued)

FOREIGN PATENT DOCUMENTS

CN 116946121 A * 10/2023 ............ B60W 50/14
DE 102019133948 A1 * 6/2021
(Continued)

*Primary Examiner* — Kevin R Steckbauer
(74) *Attorney, Agent, or Firm* — Christopher G. Darrow; Darrow Mustafa PC (57) ABSTRACT

A trailer monitoring system for a vehicle includes a processor and a memory communicably coupled to the processor. The memory stores instructions that when executed by the processor cause the processor to receive, from at least one monocular camera mounted to a vehicle towing a trailer, at least one monocular camera image of at least a portion of the trailer. The instructions also cause the processor to generate at least one depth map based on the at least one monocular camera image. The instructions further cause the processor to identify a trailer irregularity based on the at least one depth map.

17 Claims, 7 Drawing Sheets

(51) Int. Cl.
*B60W 50/14* (2020.01)
*G06T 7/00* (2017.01)
*G06T 7/13* (2017.01)
*G06T 7/50* (2017.01)
*G06V 20/58* (2022.01)
*H04N 7/18* (2006.01)
*H04N 23/54* (2023.01)

(56) References Cited

U.S. PATENT DOCUMENTS

| | | | |
|---|---|---|---|
| 10,496,892 B2 * | 12/2019 | Son | B62D 15/021 |
| 10,875,574 B2 * | 12/2020 | Ziebart | B62D 15/027 |
| 10,899,384 B2 * | 1/2021 | Zarco | B62D 13/06 |
| 10,984,553 B2 * | 4/2021 | Ramirez Llanos | B60D 1/62 |
| 11,030,476 B2 * | 6/2021 | Xu | H04N 7/188 |
| 11,067,993 B2 * | 7/2021 | Gali | B60R 1/26 |
| 11,231,716 B2 * | 1/2022 | Mepham | G05D 1/0251 |
| 11,661,006 B2 * | 5/2023 | Gali | H04N 5/265 |
| | | | 348/38 |
| 11,721,108 B2 * | 8/2023 | El-Sawah | B60W 50/14 |
| | | | 382/181 |
| 11,763,439 B2 * | 9/2023 | Barish | G06Q 10/08 |
| | | | 345/420 |
| 11,787,336 B2 * | 10/2023 | Raeis Hosseiny | B60R 11/04 |
| | | | 348/148 |
| 11,794,809 B1 * | 10/2023 | Alghooneh | B62D 15/021 |
| 11,983,969 B2 * | 5/2024 | Biberstein | B60R 16/0236 |
| 12,001,213 B2 * | 6/2024 | Gali | B60R 1/26 |
| 2009/0271078 A1 * | 10/2009 | Dickinson | G06V 10/255 |
| | | | 701/51 |
| 2013/0226390 A1 * | 8/2013 | Luo | B60D 1/36 |
| | | | 348/148 |
| 2014/0160276 A1 * | 6/2014 | Pliefke | B62D 13/06 |
| | | | 348/118 |
| 2014/0200759 A1 * | 7/2014 | Lu | G06T 7/73 |
| | | | 701/28 |
| 2017/0217372 A1 * | 8/2017 | Lu | B60R 16/027 |
| 2018/0121742 A1 * | 5/2018 | Son | B62D 15/021 |
| 2018/0350108 A1 * | 12/2018 | Wang | G06T 7/254 |
| 2019/0016382 A1 * | 1/2019 | Zarco | G05D 1/0038 |
| 2019/0064831 A1 * | 2/2019 | Gali | G05D 1/0214 |
| 2019/0283803 A1 * | 9/2019 | Auner | B60R 1/003 |
| 2019/0322317 A1 * | 10/2019 | Pourrezaei Khaligh | G01P 3/04 |
| 2019/0329821 A1 * | 10/2019 | Ziebart | B62D 13/06 |
| 2019/0340787 A1 * | 11/2019 | Ramirez Llanos | B60D 1/62 |
| 2020/0104612 A1 * | 4/2020 | Chen | G01S 17/42 |
| 2020/0269852 A1 * | 8/2020 | Miller | B60D 1/36 |
| 2021/0094473 A1 * | 4/2021 | Gali | B60R 1/26 |
| 2021/0341929 A1 * | 11/2021 | Gali | B60R 1/00 |
| 2022/0001921 A1 * | 1/2022 | Nakano | B60T 7/20 |
| 2022/0147742 A1 * | 5/2022 | El-Sawah | G06V 10/454 |
| 2022/0237952 A1 * | 7/2022 | Biberstein | G06T 7/194 |
| 2022/0343535 A1 * | 10/2022 | Ip | G06T 7/73 |
| 2022/0358677 A1 * | 11/2022 | Critchley | G06T 7/70 |
| 2022/0410804 A1 * | 12/2022 | Raeis Hosseiny | B60D 1/015 |
| 2023/0128009 A1 * | 4/2023 | Barish | G06T 7/50 |
| | | | 345/420 |
| 2023/0162509 A1 * | 5/2023 | DeLizo | G01B 17/00 |
| | | | 382/103 |
| 2023/0192122 A1 * | 6/2023 | Ramirez Llanos | G06T 7/11 |
| | | | 701/507 |
| 2023/0249680 A1 * | 8/2023 | Zwegers | B62D 59/04 |
| | | | 701/25 |
| 2023/0331298 A1 * | 10/2023 | Alghooneh | B60W 50/14 |
| 2023/0415648 A1 * | 12/2023 | Raeis Hosseiny | B60R 11/04 |
| 2024/0110805 A1 * | 4/2024 | Sisbot | G01C 21/3685 |
| 2024/0116497 A1 * | 4/2024 | Sisbot | B60W 30/09 |
| 2024/0116530 A1 * | 4/2024 | Sisbot | B60W 50/16 |

FOREIGN PATENT DOCUMENTS

| | | | | |
|---|---|---|---|---|
| DE | 102022126702 A1 | * | 10/2023 | B60W 50/14 |
| EP | 3318469 A1 | * | 5/2018 | B60D 1/24 |
| EP | 3560796 A1 | * | 10/2019 | B60R 1/00 |
| WO | WO-2023075892 A1 | * | 5/2023 | G06Q 10/067 |

* cited by examiner

TRAILER MONITORING SYSTEM

TECHNICAL FIELD

The embodiments disclosed herein relate to a trailer monitoring system and, more particularly, to a trailer monitoring system based on depth maps generated based on monocular camera images.

BACKGROUND

Some vehicles are equipped with trailer monitoring systems, which monitor a trailer towed by the vehicle to determine whether the trailer is being towed properly. These systems may be camera-based and may also require prior knowledge of the trailer's dimensions, weight, aerodynamics, etc. and/or the kinematics between the vehicle and the trailer. Accordingly, these systems may require complicated calculations based on those factors to determine whether the trailer is being towed properly.

SUMMARY

Disclosed herein are embodiments of a trailer monitoring system and a method of operating the trailer monitoring system.

In one aspect, a trailer monitoring system is disclosed. The trailer monitoring system includes a processor and a memory communicably coupled to the processor. The memory stores instructions that when executed by the processor cause the processor to receive, from at least one monocular camera mounted to a vehicle towing a trailer, at least one monocular camera image of at least a portion of the trailer. The instructions also cause the processor to generate at least one depth map based on the at least one monocular camera image. The instructions further cause the processor to identify a trailer irregularity based on the at least one depth map.

In another aspect, a method of operating a trailer monitoring system is disclosed. The method includes receiving, from at least one monocular camera mounted to a vehicle towing a trailer, at least one monocular camera image of at least a portion of the trailer. The method also includes generating at least one depth map based on the at least one monocular camera image. The method further includes identifying a trailer irregularity based on the at least one depth map. These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a trailer monitoring system for a vehicle equipped to tow a trailer. The trailer monitoring system is configured to detect one or more irregularities of the trailer during towing, for example, an imminent collision of the trailer with a nearby object such as a nearby vehicle, departure of the trailer from the lane in which the vehicle is traveling, and/or swaying of the trailer within the lane in which the vehicle is traveling or across multiple lanes. The trailer monitoring system may detect an irregularity by receiving, from one or more monocular cameras mounted to the vehicle, one or more monocular camera images of at least a portion of the trailer. Based on the monocular camera image(s), the trailer monitoring system can generate one or more depth maps and identify the irregularity based on the depth map(s).

Figure 1:
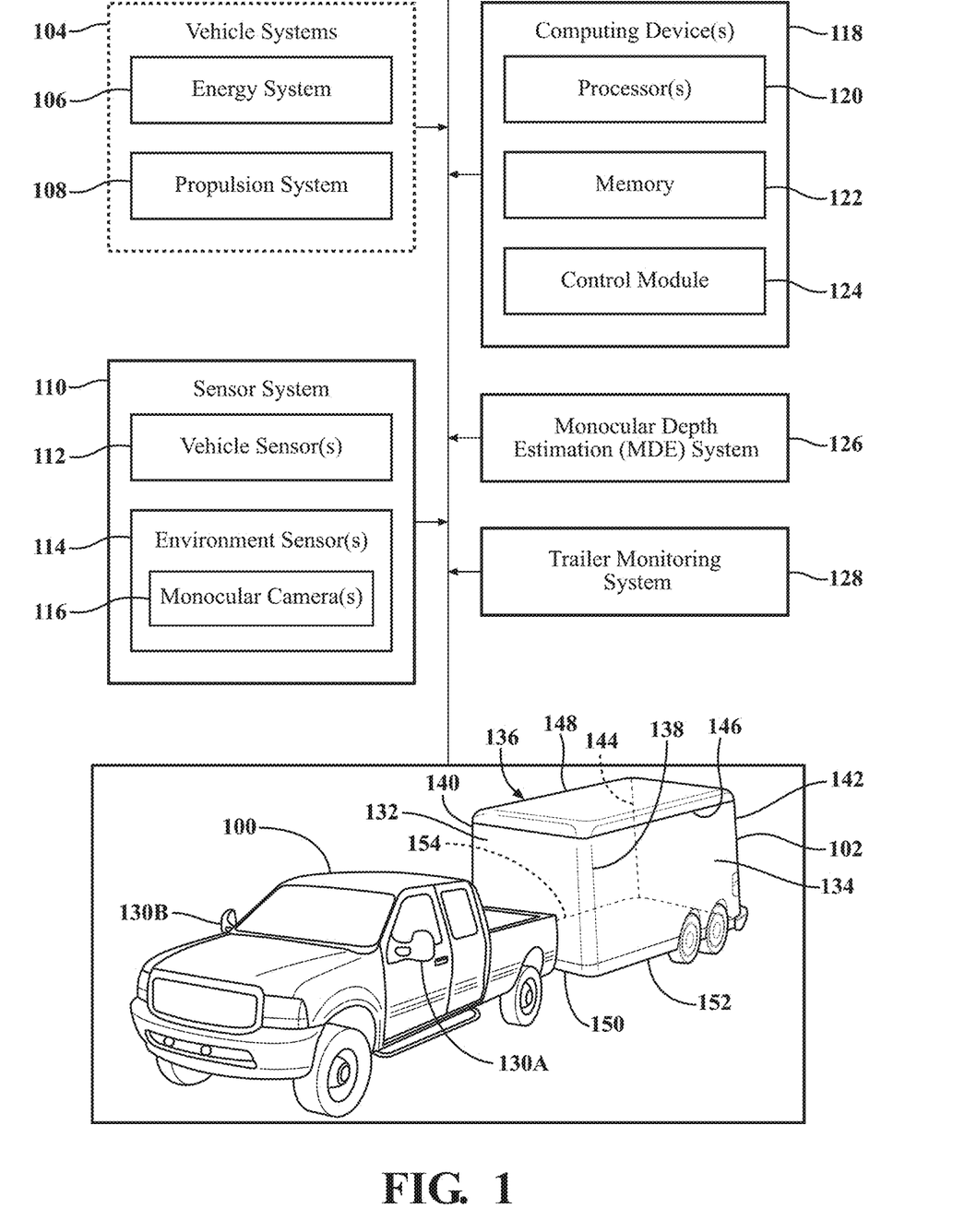
FIG. 1 is an example of a trailer monitoring system for a vehicle configured to tow a trailer.

A representative passenger vehicle 100 is shown in FIG. 1 towing a representative trailer 102. In this description, uses of "front," "forward" and the like, and uses of "rear," "rearward" and the like, refer to the longitudinal directions of the vehicle 100. "Front," "forward" and the like refer to the front (fore) of the vehicle 100, while "rear," "rearward" and the like refer to the back (aft) of the vehicle 100. Uses of "side," "sideways," "transverse" and the like refer to the lateral directions of the vehicle 100, with "driver's side" and the like referring to the left side of the vehicle 100, and "passenger side" and the like referring to the right side of the vehicle 100. The vehicle 100 may be any suitable type of vehicle 100. As shown, the vehicle 100 is a pickup truck, but the vehicle 100 can be any other type of vehicle, such as a sedan, an SUV, a motorhome, etc. The vehicle 100 is configured to tow the trailer 102. As shown, the trailer 102 is a storage trailer, but the trailer 102 can be any other type of trailer, such as a camper, a boat trailer, a flatbed trailer, etc.

The vehicle 100 includes an exterior and a number of interior compartments. The compartments include a passenger compartment, an engine compartment (and, in the illustrated pickup truck configuration of the vehicle 100, an open-topped bed for carrying cargo). Among other things, the vehicle 100 may include seats, a dash assembly, an instrument panel, controls and the like housed in the passenger compartment. Additionally, the vehicle 100 may include an engine, a motor, a transmission, and the like, as well as other powertrain components, such as wheels, housed in the engine compartment and elsewhere in the vehicle 100. The wheels support the remainder of the vehicle 100 on the ground. One, some or all of the wheels are powered by the remainder of the powertrain components to drive the vehicle 100 along the ground.

The vehicle 100 includes one or more vehicle systems 104 operable to perform vehicle functions. In addition to the vehicle systems 104, the vehicle 100 includes a sensor system 110 as well as one or more processors 120, a memory 122, and a control module 124 to which the vehicle systems 104 and the sensor system 110 are communicatively connected. The sensor system 110 is operable to detect information about the vehicle 100. The processors 120, the memory 122, and the control module 124 together serve as one or more computing devices 118 whose control module 124 is employable to orchestrate the operation of the vehicle 100, in whole or in part. Specifically, the control module 124 operates the vehicle systems 104 based on information about the vehicle 100. Accordingly, as a prerequisite to operating the vehicle systems 104, the control module 124 gathers information about the vehicle 100, including the information about the vehicle 100 detected by the sensor system 110. The control module 124 then evaluates the information about the vehicle 100 and operates the vehicle systems 104 based on its evaluation.

The vehicle systems 104 are part of, mounted to, or otherwise supported by the body. The vehicle systems 104 may be housed, in whole or in part, in any combination of the passenger compartment, the engine compartment, or elsewhere in the vehicle 100. Each vehicle system 104 includes one or more vehicle elements. On behalf of the vehicle system 104 to which it belongs, each vehicle element is operable to perform, in whole or in part, any combination of vehicle functions with which the vehicle system 104 is associated. It will be understood that the vehicle elements, as well as the vehicle system 104 to which they belong, may but need not be mutually distinct.

The vehicle systems 104 include an energy system 106 and a propulsion system 108. The energy system 106 and the propulsion system 108 are connected to one another. Moreover, the drivetrain is mechanically connected to the propulsion system 108. The propulsion system 108 and the drivetrain together serve as a powertrain for the vehicle 100. The energy system 106 is operable to perform one or more energy functions, including but not limited to storing and otherwise handling energy. The propulsion system 108 is operable to perform one or more propulsion functions using energy from the energy system 106, including but not limited to powering the wheels.

As a part of the sensor system 110, the vehicle 100 includes one or more vehicle sensors 112 and one or more environment sensors 114. The vehicle sensor(s) 112 monitor the vehicle 100 in real-time. The vehicle sensor(s) 112, on behalf of the sensor system 110, are operable to detect information about the vehicle 100, including information about user requests and information about the operation of the vehicle 100. For example, the vehicle sensor(s) 112 can be configured to detect and/or acquire data about various operating parameters of the vehicle 100. For example, the vehicle sensor(s) 112 can include one or more speedometers, one or more gyroscopes, one or more accelerometers, one or more inertial measurement units (IMUs), one or more wheel sensors, one or more steering angle sensors, one or more controller area network (CAN) sensors, and the like. Relatedly, among information about the operation of the vehicle 100, the sensor system 110 is operable to detect the location and motion of the vehicle 100, including its speed, acceleration, orientation, rotation, direction, and the like, the movement of the wheels, the steering angle, and the operational statuses of one, some, or all of the vehicle systems 104.

The environment sensor(s) 114 can be configured to detect, determine, assess, monitor, measure, quantify, acquire, and/or sense data or information about the external environment in which the vehicle 100 is located or one or more portions thereof. The environment sensor(s) 114 can include one or more exterior cameras and one or more exterior sensors, such as temperature sensors, weather sensors, LIDAR, RADAR, etc. The exterior cameras can include one or more monocular cameras 116. The environment sensor(s) 114 can be located on an exterior of the vehicle 100 or can be located in any other suitable location on the vehicle 100. Using the environment sensor(s) 114, the vehicle systems 104 can determine information about the external environment of the vehicle 100. For example, the vehicle systems 104 can detect one or more objects in the external environment of the vehicle 100.

Figure 2A:
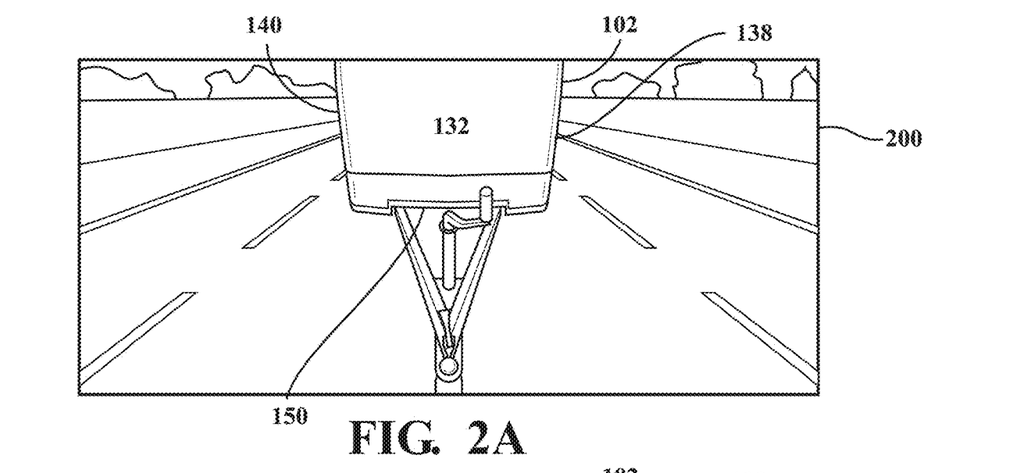
FIG. 2A is an example of a monocular camera image of the trailer taken by a monocular camera mounted to the vehicle.
Figure 3:
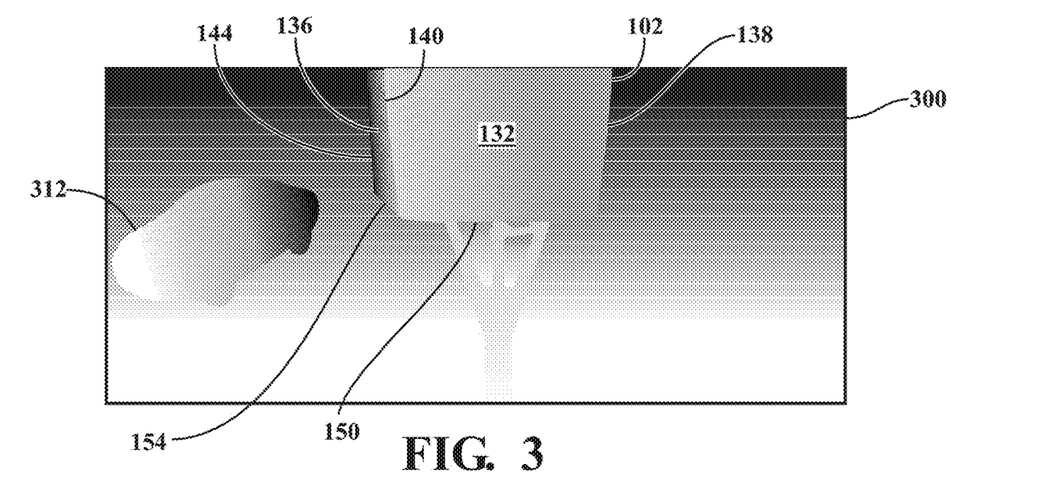
FIG. 3 is an example of a depth map that the trailer monitoring system may use to detect an irregularity of the trailer, where the irregularity is an imminent collision with a nearby vehicle.
Figure 4A:
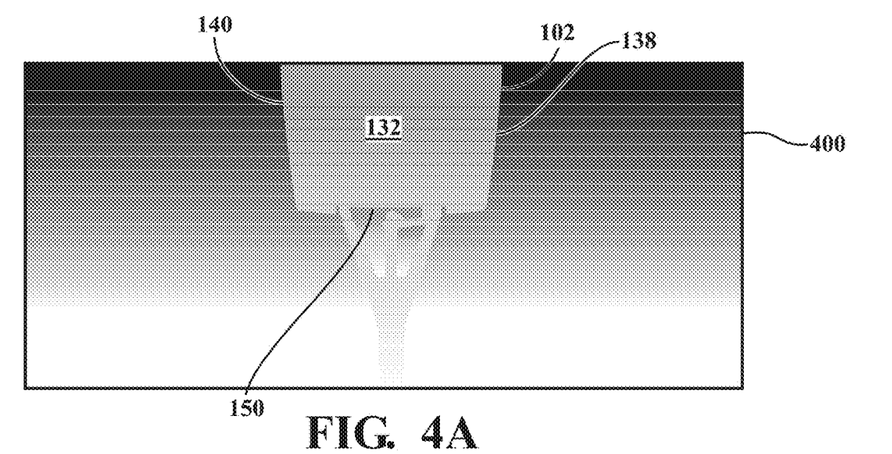
FIG. 4A is an example of a first depth map that the trailer monitoring system may use to detect to detect an irregularity of the trailer, where the irregularity is lane departure.
Figure 4B:
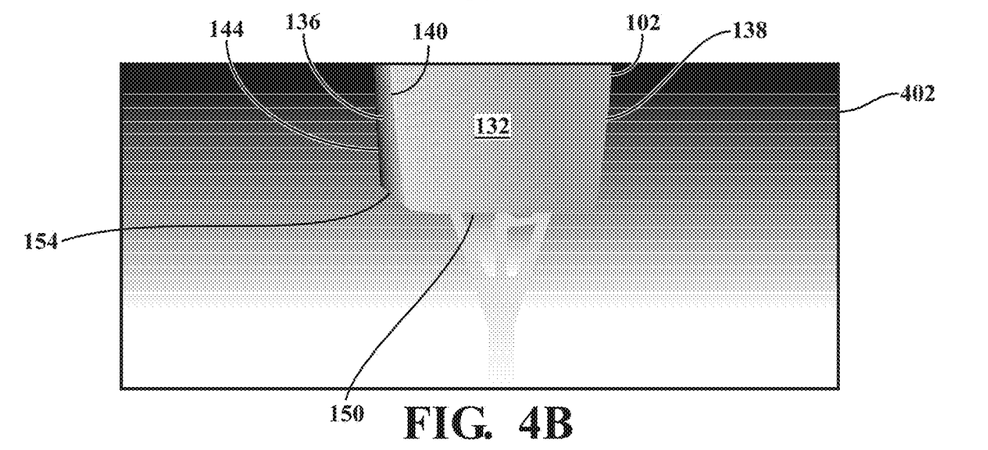
FIG. 4B is an example of a second depth map that the trailer monitoring system may use to detect lane departure.
Figure 4C:
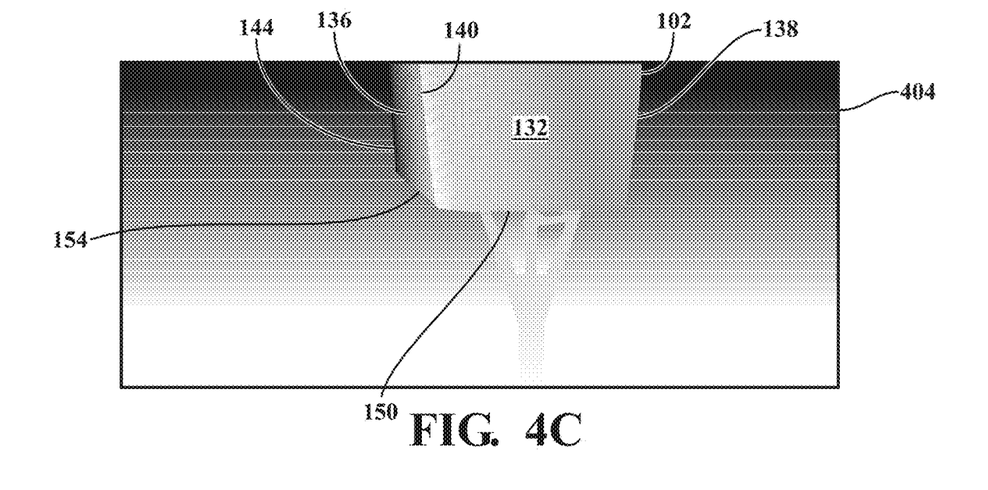
FIG. 4C is an example of a third depth map that the trailer monitoring system may use to detect lane departure.
Figure 5A:
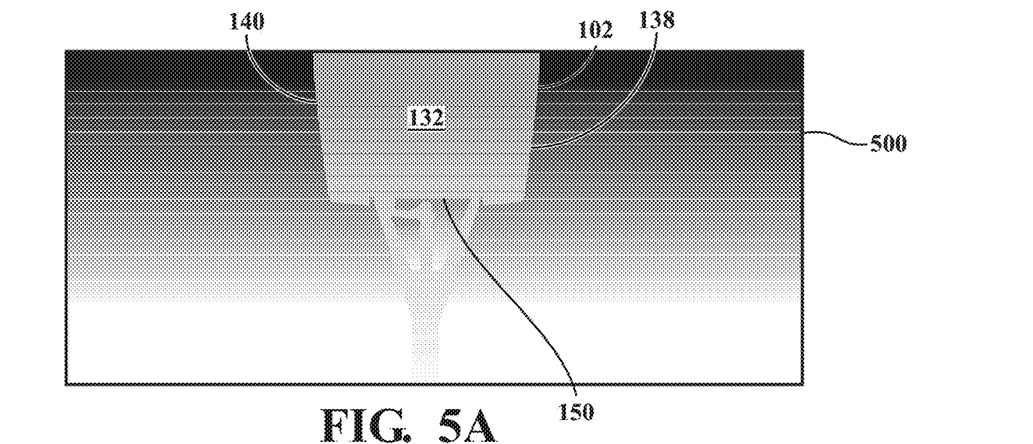
FIG. 5A is an example of a first depth map that the trailer monitoring system may use to detect to detect an irregularity of the trailer, where the irregularity is trailer sway.
Figure 5B:
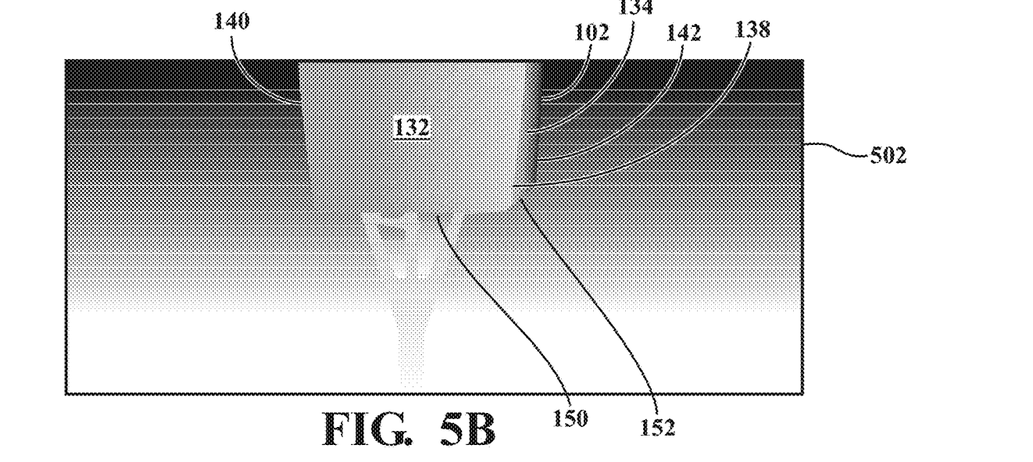
FIG. 5B is an example of a second depth map that the trailer monitoring system may use to detect trailer sway.
Figure 5C:
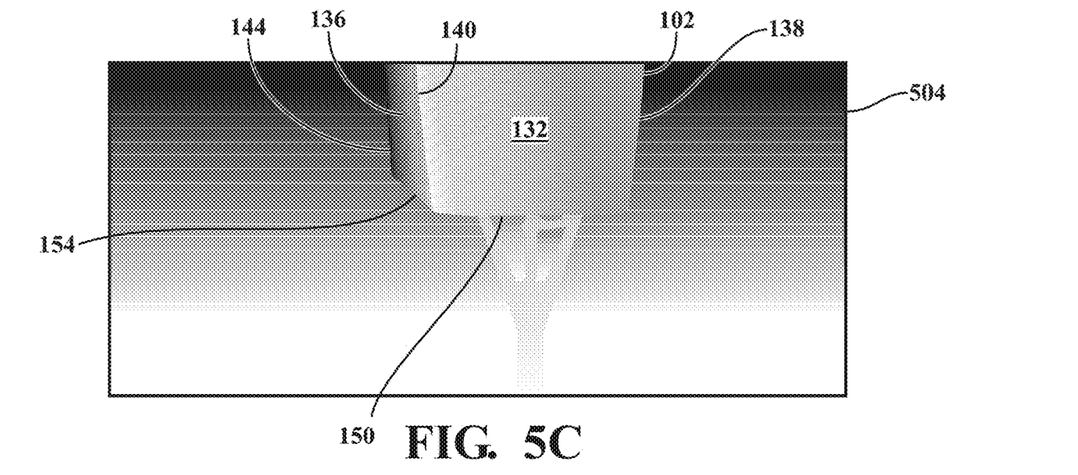
FIG. 5C is an example of a third depth map that the trailer monitoring system may use to detect trailer sway.

The vehicle systems 104, the sensor system 110, the processors 120, the memory 122, and the control module 124 may be leveraged to implement a monocular depth estimation (MDE) system 126. In the vehicle 100, the vehicle systems 104, the sensor system 110, the processors 120, the memory 122, and the control module 124 leveraged to implement the MDE system 126 may be part of one or more other control systems typical of vehicles or may be dedicated to the MDE system 126. The MDE system 126 will be described with reference to a representative monocular camera image 200 as shown in FIG. 2A, a depth map 202 of FIG. 2B, a depth map 300 of FIG. 3, depth maps 400, 402, and 404 of FIGS. 4A-4C, and depth maps 500, 502, and 504 as shown in FIGS. 5A-5C. As described with respect to FIGS. 2B-5C, the MDE system 126 may be configured to generate depth map(s) of at least a portion of the external environment of the vehicle 100 based on information received from the sensor system 110. More specifically, the MDE system 126 may be configured to generate depth map(s) based, at least in part, on information received by the monocular camera(s) 116. The depth map(s) may then be used as an input to other vehicle systems 104, for example, a trailer monitoring system 128, as described in further detail below.

Figure 2B:
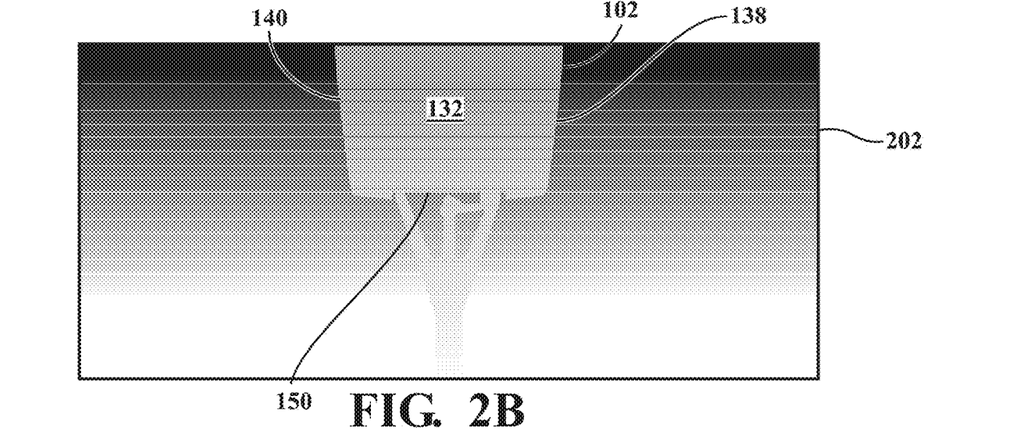
FIG. 2B is an example of a depth map generated based on the monocular camera image.

As mentioned above, the vehicle 100 may include one or more monocular cameras 116. The monocular camera(s) 116 may be mounted to the exterior of the vehicle 100 at the front of the vehicle 100, at the rear of the vehicle 100, and/or at any other location on the vehicle 100. For example, the monocular camera(s) 116 can be mounted to the rear of the vehicle 100 and/or one or more side view mirrors 130 (FIG. 1) of the vehicle 100 (for example, a left side view mirror 130A and a right side view mirror 130B) and can have a field of view of at least a portion of the trailer 102. The monocular camera(s) 116 are configured to capture one or more monocular camera images of the trailer 102. Referring now to FIG. 2A, an example of a monocular camera image 200 is shown. The monocular camera image 200 shows a view of a front of the trailer 102. The monocular camera image 200 may be a color image typical of other types of vehicle-mounted cameras. Referring now to FIG. 2B, an example of a depth map 202 is shown. The depth map 202 is generated based on the monocular camera image 200 and is a monochrome image in which the pixel values of the depth map 202 are proportional to the distance between the monocular camera 116 and the object in the monocular camera image 200 (e.g., the trailer 102).

In addition to the MDE system 126, the vehicle systems 104, the sensor system 110, the processor(s) 120, the memory 122, and the control module 124 may be leveraged to implement a trailer monitoring system 128 based on the MDE system 126. In the vehicle 100, the vehicle systems 104, the sensor system 110, the processor(s) 120, the memory 122, and the control module 124 leveraged to implement the trailer monitoring system 128 may be part of one or more other control systems typical of vehicles or may be dedicated to the trailer monitoring system 128. The trailer monitoring system 128 may be configured to identify one or more trailer irregularities based only on the depth map(s). This may be advantageous over other methods of identifying trailer irregularities because reliance only on the depth map(s) eliminates the need for prior knowledge of the dimensions, weight, aerodynamics, etc. of the trailer 102 and/or the kinematics between the vehicle 100 and the trailer 102.

Based on the depth map(s), the trailer monitoring system 128 may be configured to identify one or more contours of the trailer 102. More specifically, based on each depth map 202, a point cloud may be generated including an array of points that each correspond to the distance from the trailer 102 to the monocular camera 116. Using a direct transformation, the point cloud can be used to detect the contours. Referring back to FIG. 1, the contours can include one or more faces, for example, a front face 132 corresponding to the front of the trailer 102, a left face 134 corresponding to the left side of the trailer 102, and a right face 136 corresponding to the right side of the trailer 102. The contours can also include one or more edges, for example, two front side edges and two rear side edges. The two front side edges can include a front left side edge 138 and a front right side edge 140. The two rear side edges can include a rear left side edge 142 and a rear right side edge 144. The edges can also include one or more top edges. The top edges can include a top left side edge 146 and a top right side edge 148. The edges can also include one or more bottom edges. The bottom edges can include a front bottom edge 150, a left side bottom edge 152, and a right side bottom edge 154. Using the contours detected in the depth map(s), the trailer monitoring system 128 may be configured to detect one or more trailer irregularities during towing.

In some instances, the trailer irregularity can be identified using a single depth map. For example, referring to FIG. 3, the trailer irregularity can be an imminent collision between the trailer 102 and an object 312 near the trailer 102. The object 312 may be a nearby vehicle located in a lane adjacent the vehicle 100 and the trailer 102, as shown, or any other object. In some instances, the object can be a fixed feature of the environment, such as one or more curbs, light poles, traffic lights, road signs, etc. The trailer monitoring system 128 can identify an imminent collision between the trailer 102 and the object 312 by comparing the depth of one or more of the contours to the depth of the object 312. When the depth of a contour is similar to the depth of the object 312, an imminent collision may be identified. For example, when the trailer 102 departs the lane towards the adjacent right lane, and there is another vehicle traveling in the adjacent right lane, the trailer monitoring system 128 can compare the depth of the front right side edge 140 and/or the depth of the rear right side edge 144 to the depth of the object 312, and, if the depths are the same or similar, the trailer monitoring system 128 can identify an imminent collision with the object 312. In another example, when the trailer 102 departs the lane towards an adjacent left lane, and there is another vehicle traveling in the adjacent left lane, the trailer monitoring system 128 can compare the depth of the front left side edge 138 and/or the depth of the rear left side edge 142 to the depth of the other vehicle, and, if the depths are the same, the trailer monitoring system 128 can identify an imminent collision between the trailer 102 and the other vehicle. In some instances, the object 312 may be the vehicle 100 itself, and the imminent collision may be an imminent collision between the trailer 102 and the vehicle 100 itself. This may occur when the vehicle 100 is making a sharp turn.

In some instances, the trailer irregularity may be identified by comparing the depth of one or more of the contours over a plurality of consecutive or otherwise successive depth maps. For example, the monocular camera(s) 116 may be configured to capture a monocular camera image every second, for example, and thus, generate a depth map every second. Using consecutive or otherwise successive depth maps, the trailer irregularity can be identified by detecting a change in the depth of one or more of the contours over time as the trailer 102 is moving. Referring to FIGS. 4A-4C, the trailer irregularity can be departure of the trailer 102 from the lane in which the vehicle 100 is traveling (lane departure), assuming the vehicle 100 itself is not switching lanes. The trailer monitoring system 128 can identify lane departure when the depth of one or more of the contours decreases over successive depth maps 400, 402, and 404. For example, as shown in FIGS. 4A-4C, when the trailer 102 departs the lane such that the trailer 102 moves into the adjacent right lane, the depth of each of the front face 132, the right face 136, the front right side edge 140, the right side bottom edge 154, and the rear right side edge 144 all decrease over the successive depth maps 400, 402, and 404, and the trailer monitoring system 128 can identify that the trailer 102 has departed the lane and at least a portion of the trailer 102 is in the adjacent right lane. More specifically, referring to FIG. 4A, which shows a first successive depth map 400, the trailer 102 is shown traveling in the same lane as the vehicle 100, and is not departing the lane. FIG. 4B, which shows a second successive depth map 402, shows the trailer 102 moving into the adjacent lane. In FIG. 4B, the depth of the front face 132, the right face 136, the front right side edge 140, the right side bottom edge 154, and/or the rear right side edge 144 are less than they are in FIG. 4A, and thus, the trailer monitoring system 128 can identify lane departure. FIG. 4C, which shows a third successive depth map 404, shows the trailer 102 moving further into the adjacent lane. The depth of the front face 132, the right face 136, the front right side edge 140, the right side bottom edge 154, and/or the rear right side edge 144 are less than they are in FIG. 4B, and thus, the trailer monitoring system 128 can identify lane departure.

Referring now to FIGS. 5A-5C, in some instances, the trailer irregularity can be swaying of the trailer 102 (trailer sway). The trailer monitoring system 128 can identify trailer sway when the depth of one or more of the contours fluctuates (e.g., increases and decreases repeatedly) over successive depth maps 500, 502, and 504. For example, the trailer monitoring system 128 can identify trailer sway when the depth of the front face 132 fluctuates, when the depth of the front right side edge 140 fluctuates, and/or when the depth of the front left side edge 138 fluctuates. For example, referring to FIG. 5B, the depth of the left face 134, the left front side edge 138, the rear left side edge 142, and/or the left side bottom edge 152 may fluctuate when the trailer is swaying toward the left. In another example, referring to FIG. 5C, the depth of the right face 136, the front right side edge 140, the rear right side edge 144, and/or the right side bottom edge 154 may fluctuate when the trailer is swaying to the right. When the vehicle 100 includes a monocular camera 116 mounted to the left side view mirror 130A of the vehicle 100, the trailer monitoring system 128 can identify trailer sway when the depth of the right side of the trailer 102 fluctuates, for example, when the depth of the right face 136 fluctuates, when the depth of the top right side edge 148 fluctuates, and/or when the depth of the rear right side edge 144 fluctuates. When the vehicle 100 includes a monocular camera 116 mounted to the right side view mirror 130B of the vehicle 100, the trailer monitoring system 128 can identify trailer sway when the depth of the left side of the trailer 102 fluctuates, for example, when the depth of the left face 134 fluctuates, when the depth of the top left side edge 146 fluctuates, and/or when the depth of the rear left side edge 142 fluctuates.

In any of the above-described examples, upon the detection of trailer irregularity, the trailer monitoring system 128 may be configured to issue a warning or make a corrective action by taking control of the vehicle 100. For example, when the trailer irregularity is trailer sway, the trailer monitoring system 128 can issue a warning to the driver and/or take control of the steering and/or speed of the vehicle 100 to reduce the trailer sway. When the trailer irregularity is lane departure, the trailer monitoring system 128 can issue a warning to the driver, take control of the steering and/or speed of the vehicle 100 to bring the trailer 102 back in the lane, and/or issue a warning to nearby vehicles, such as by honking or flashing the lights of the vehicle 100 and/or the trailer 102. When the trailer irregularity is an imminent collision, the trailer monitoring system 128 can issue a warning to the driver, take control of the steering and/or speed of the vehicle 100 to prevent the collision, and/or issue a warning to nearby vehicles, such as by honking or flashing the lights of the vehicle 100 and/or the trailer 102.

Figure 6:
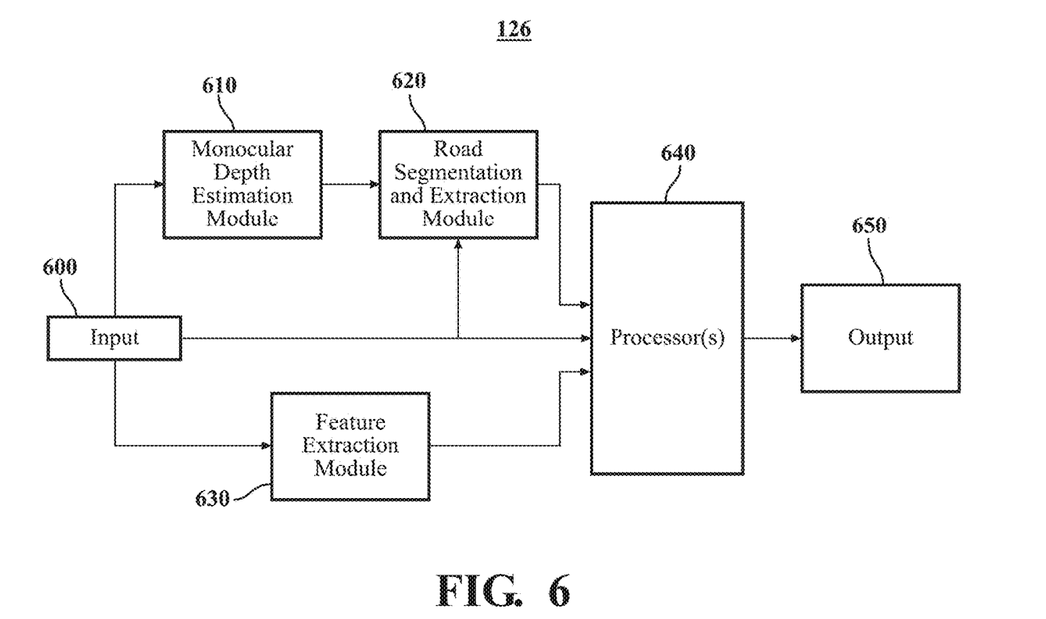
FIG. 6 is an example of a monocular depth estimation (MDE) system.

Referring now to FIG. 6, an example of the MDE system 126 is shown. The MDE system 126 may be configured to receive an input 600 and generate an output 650. The input 600 may be the monocular camera image 200. The monocular camera image 200 can be a color image taken by a monocular camera 116. The output 650 can be the identification of one or more contours of the trailer 102. The MDE system 126 includes a monocular depth estimation (MDE) module 610, a road segmentation and extraction (RSE) module 620, a feature extraction module 630, and one or more processor(s) 640. The processor(s) 640 may be the processor(s) 120 of FIG. 1 or any other suitable processor(s). The MDE module 610, the RSE module 620, and/or the feature extraction module 630 can be components of the processor(s) 640 or may be components of one or more other processors. The MDE module 610 is configured to receive the input 600 (i.e., the monocular camera image 200) and generate a depth map 202 using machine learning or any other suitable method. As described above, the depth map 202 is a grayscale image in which each pixel value is proportional to the distance to the monocular camera 116. The RSE module 620 is configured to receive the monocular camera image 200 and/or the depth map 202 and detect, segment out, and extract the part of the monocular camera image 200 and/or the depth map 202 corresponding to the road. The feature extraction module 630 may receive the input 600 and may be configured to detect features (e.g., one or more contours of the trailer 102) in the monocular camera image 200. The processor(s) 640 may function as a decision system based on the input 600 (i.e., the monocular camera image 200), the depth map 202, the road, and/or the features to generate the output 650. The output 650 may be the detection of one or more contours of the trailer 102.

With reference once again to FIG. 1, as noted above, the processor(s) 120, the memory 122, and the control module 124 together serve as the computing device(s) 118 whose control module 124 orchestrates the operation of the vehicle 100, including but not limited to the operation of the vehicle systems 104. The control module 124 may be a dedicated control module for the trailer monitoring system 128 and/or the MDE system 126. Relatedly, as part of a central control system, the vehicle 100 may include a global control unit (GCU) to which the control module 124 is communicatively connected. Alternatively, the control module 124 may be a global control module. Relatedly, as part of a central control system, the vehicle 100 may include a global control unit (GCU) to which the control module 124 belongs. Although the vehicle 100 as shown includes one control module 124, it will be understood that this disclosure is applicable in principle to otherwise similar vehicles including multiple control modules. Moreover, although the control module 124 is shown as part of the vehicle 100, it will be understood that the control module 124 may be located offboard the vehicle 100.

The processor(s) 120 may be any components configured to execute any of the processes described herein or any form of instructions to carry out such processes or cause such processes to be performed. The processor(s) 120 may be implemented with one or more general-purpose or special-purpose processors. Examples of suitable processors include microprocessors, microcontrollers, digital signal processors, or other forms of circuitry that execute software. Other examples of suitable processors include, without limitation, central processing units (CPUs), array processors, vector processors, digital signal processors (DSPs), field programmable gate arrays (FPGAs), programmable logic arrays (PLAs), application specific integrated circuits (ASICs), programmable logic circuitry, or controllers. The processor(s) 120 may include at least one hardware circuit (e.g., an integrated circuit) configured to carry out instructions contained in program code. In arrangements where there are multiple processors, the processors may work independently from each other or in combination with one another. Moreover, although the processor(s) 120 are shown as part of the vehicle 100, it will be understood that the processor(s) 120 may be located offboard the vehicle 100.

The memory 122 is a non-transitory computer readable medium. The memory 122 may include volatile or nonvolatile memory, or both. Examples of suitable memory include random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination of these. The memory 122 includes stored instructions in program code. Such instructions are executable by the processor(s) 120 or the control module 124. The memory 122 may be part of the processor(s) 120 or the control module 124 or may be communicatively connected to the processor(s) 120 or the control module 124. Generally speaking, the control module 124 includes instructions that may be executed by the processor(s) 120. The control module 124 may be implemented as computer readable program code that, when executed by the processor(s) 120, executes one or more of the processes described herein. Such computer readable program code may be stored in the memory 122. The control module 124 may be part of the processor(s) 120 or may be communicatively connected to the processor(s) 120.

Now that the various potential systems, devices, elements, and/or components have been described, various methods, including various possible steps of such method, will now be described. The methods described may be applicable to the arrangements described above, but it is to be understood that the methods can be carried out with other suitable systems and arrangements. Moreover, the methods may include other steps not shown here, and the methods are not limited to including every step shown. The blocks illustrated here as part of the methods are not limited to the particular chronological order. Indeed, some of the blocks may be performed in a different order than what is shown and/or at least some of the blocks shown can occur simultaneously.

Figure 7:
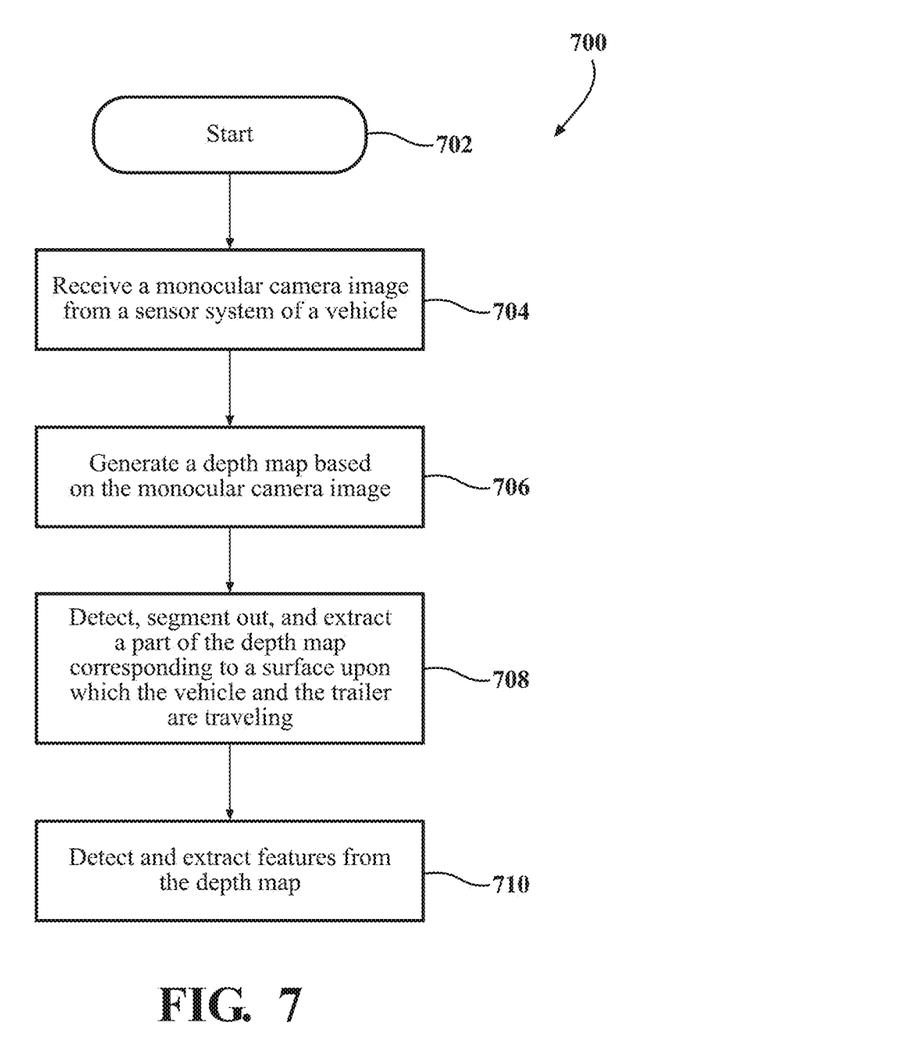
FIG. 7 is an example of a method of generating a depth map based on a monocular camera image.
Figure 8:
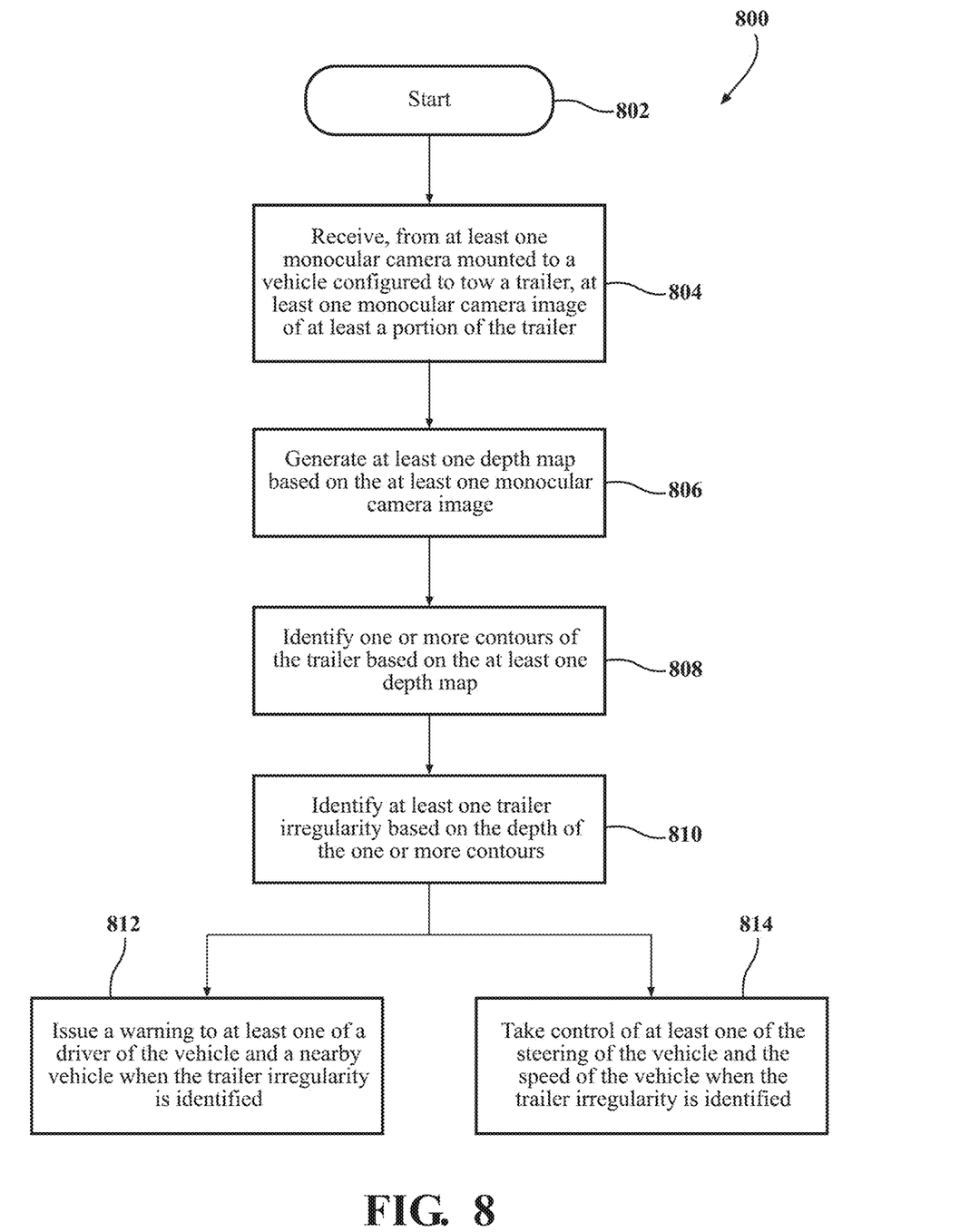
FIG. 8 is an example of a method of operating the trailer monitoring system.

Referring to FIG. 7, an example of a method 700 for generating a depth map is shown. The method 700 may begin in operation 702. In operation 704, the method 700 may include receiving a monocular camera image 200 from a sensor system 110 of a vehicle 100. In operation 706, the method 700 may include generating a depth map 202 based on the monocular camera image 200. In operation 708, the method may include detecting, segmenting out, and extracting a part of the depth map 202 corresponding to a surface upon which the vehicle 100 and the trailer 102 are traveling. In operation 710, the method 700 may include detecting and extracting features from the depth map 202. The method 700 may be used to detect one or more contours of the trailer 102. Referring now to FIG. 8, an example of a method 800 of operating the trailer monitoring system 128 is shown. The method 800 may begin in operation 802. In operation 804, the method 800 may include receiving, from at least one monocular camera 116 mounted to the vehicle 100, at least one monocular camera image 200 of at least a portion of the trailer 102. In operation 806, the method 800 may include generating at least one depth map 202 based on the at least one monocular camera image 200. In operation 808, the method 800 may include identifying one or more contours of the trailer 102 based on the depth map 202. In operation 810, the method 800 may include identifying at least one trailer irregularity based on the depth of the one or more contours. If a trailer irregularity is identified, the method 800 can proceed to operation 812 and/or operation 814. In operation 812, the method 800 includes issuing a warning to a driver of the vehicle 100 and/or a nearby vehicle when the trailer irregularity is identified. In operation 814, the method 800 includes taking control of the steering of the vehicle 100 and/or the speed of the vehicle 100 when the trailer irregularity is identified.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A trailer monitoring system, comprising:
    a processor; and
    a memory communicably coupled to the processor and storing instructions that when executed by the processor cause the processor to:
        receive, from at least one monocular camera mounted to a vehicle towing a trailer, at least one monocular camera image of at least a portion of the trailer;
        generate at least one depth map based on the at least one monocular camera image;
        identify at least one contour of the trailer based on the at least one depth map, the contour being at least one of a face of the trailer or an edge of the trailer; and
        identify a trailer irregularity based on the at least one depth map by comparing a depth of the at least one contour of the trailer over successive depth maps, the trailer irregularity being lane departure when the depth decreases over the successive depth maps, and the trailer irregularity being trailer sway when the depth fluctuates over the successive depth maps.

2. The trailer monitoring system of claim 1, wherein the at least one monocular camera is mounted to at least one of a rear of the vehicle or one or more side view mirrors of the vehicle and has a field of view of at least one of a front of the trailer or one or more sides of the trailer.

3. The trailer monitoring system of claim 1, wherein the at least one contour of the trailer includes one or more of:
    one or more faces, the one or more faces including at least one of a front face or two side faces; and
    one or more edges, the one or more edges including at least one of two front side edges or two rear side edges.

4. The trailer monitoring system of claim 3, wherein the instructions further cause the processor to:
    identify the depth of an object located near the trailer;
    determine that the depth of the at least one of the one or more faces or the one or more edges is similar to the depth of the object; and
    identify that the trailer irregularity is an imminent collision between the trailer and the object.

5. The trailer monitoring system of claim 4, wherein the object located near the trailer is the vehicle, and wherein the imminent collision is an imminent collision between the trailer and the vehicle.

6. The trailer monitoring system of claim 3, wherein the instructions further cause the processor to:
    determine that the depth of the at least one of the one or more faces or the one or more edges decreases over the successive depth maps; and
    identify that the trailer irregularity is lane departure.

7. The trailer monitoring system of claim 3, wherein the instructions further cause the processor to:
    determine that the depth of the at least one of the one or more faces or the one or more edges fluctuates over the successive depth maps; and
    identify that the trailer irregularity is trailer sway.

8. The trailer monitoring system of claim 1, wherein the instructions further cause the processor to take control of at least one of a steering of the vehicle or a speed of the vehicle when the trailer irregularity is identified.

9. A method, comprising:
    receiving, from at least one monocular camera mounted to a vehicle towing a trailer, at least one monocular camera image of at least a portion of the trailer;
    generating at least one depth map based on the at least one monocular camera image;
    identifying at least one contour of the trailer based on the at least one depth map, the contour being at least one of a face of the trailer or an edge of the trailer; and
    identifying a trailer irregularity based on the at least one depth map by comparing a depth of the at least one contour of the trailer over successive depth maps, the trailer irregularity being lane departure when the depth decreases over the successive depth maps, and the trailer irregularity being trailer sway when the depth fluctuates over the successive depth maps.

10. The method of claim 9, wherein the at least one monocular camera is mounted to at least one of a rear of the vehicle or one or more side view mirrors of the vehicle and has a field of view of at least one of a front of the trailer or one or more sides of the trailer.

11. The method of claim 9, wherein the at least one contour of the trailer includes one or more of:
one or more faces, the one or more faces including at least one of a front face or two side faces; and
one or more edges, the one or more edges including at least one of two front side edges or two rear side edges.

12. The method of claim 11, further comprising:
identifying the depth of an object located near the trailer;
determining that the depth of the at least one of the one or more faces or the one or more edges is similar to the depth of the object; and
identifying that the trailer irregularity is an imminent collision between the trailer and the object.

13. The method of claim 12, wherein the object located near the trailer is the vehicle, and wherein the imminent collision is an imminent collision between the trailer and the vehicle.

14. The method of claim 11, further comprising:
determining that the depth of the at least one of the one or more faces or the one or more edges decreases over the successive depth maps; and
identifying that the trailer irregularity is lane departure.

15. The method of claim 9, further comprising:
determining that the depth of the at least one of the one or more faces or the one or more edges fluctuates over the successive depth maps; and
identifying that the trailer irregularity is trailer sway.

16. The method of claim 9, further comprising taking control of at least one of a steering of the vehicle or a speed of the vehicle when the trailer irregularity is identified.

17. A non-transitory computer-readable medium including instructions that, when executed by a processor, cause the processor to:
receive, from at least one monocular camera mounted to a vehicle towing a trailer, at least one monocular camera image of at least a portion of the trailer;
generate at least one depth map based on the at least one monocular camera image;
identify at least one contour of the trailer based on the at least one depth map, the contour being at least one of a face of the trailer or an edge of the trailer; and
identify a trailer irregularity by comparing a depth of the at least one contour of the trailer over successive depth maps, the trailer irregularity being lane departure when the depth decreases over the successive depth maps, and the trailer irregularity being trailer sway when the depth fluctuates over the successive depth maps.

* * * * *